United States Patent [19]
Hudspeth

[11] 4,121,233
[45] Oct. 17, 1978

[54] COLLAPSIBLE FLARE BAFFLE FOR FOLDING CAMERA

[75] Inventor: William Hudspeth, Norwell, Mass.

[73] Assignee: Polaroid Corporation, Cambridge, Mass.

[21] Appl. No.: 809,987

[22] Filed: Jun. 27, 1977

[51] Int. Cl.$^2$ .................... G03B 17/04; G03B 17/50; G03B 15/00; G03B 17/02
[52] U.S. Cl. .................................... 354/150; 354/83; 354/187; 354/288
[58] Field of Search ............... 354/202, 288, 187, 150, 354/152, 194, 83, 86

[56] References Cited

U.S. PATENT DOCUMENTS

| | | | |
|---|---|---|---|
| 1,479,112 | 1/1924 | Sparks | 354/202 |
| 3,682,068 | 8/1972 | Stieger | 354/187 |
| 3,936,851 | 2/1976 | Wareham | 354/288 |
| 3,984,854 | 10/1976 | Wolcott | 354/288 |

*Primary Examiner*—Donald A. Griffin
*Attorney, Agent, or Firm*—Frank J. Caufield

[57] ABSTRACT

A thin-walled, collapsible, conical-shaped light baffle is provided on the inside of the exposure chamber of a compact folding reflex camera to reduce flare at the camera's focal plane during exposure. The light baffle is preferably formed of an opaque elastic material, such as a terpolymer, to provide it with a resilient characteristic which automatically biases it to assume a normally extended position when the camera is erected from a folded position. While in its extended position, the baffle is aligned with the optical path of the camera so that the interior surface of its lateral wall intercepts unwanted radiation originating outside of the camera's field of view which would, in the absence of the baffle, reflect off interior surfaces of the camera and cause either extraneous images and/or a contrast reduction in the final photographic record. The interior surface of the conical light baffle includes a plurality of spaced projections, concentric with respect to its axis of revolution, for trapping the intercepted unwanted radiation to absorb it. Also provided is an elastic elongated member for maintaining the baffle in proper alignment while in its extended position along the camera's optical path. When the camera is folded, the baffle is collapsed into a compact flat shape. Additionally provided are a series of spaced baffles arranged transverse to fold lines of a flexible opaque envelope which, in part, defines the camera's exposure chamber. The spaced baffles also provide a flare prevention function.

18 Claims, 7 Drawing Figures

COLLAPSIBLE FLARE BAFFLE FOR FOLDING CAMERA

BACKGROUND OF THE INVENTION

1. Field of the Invention

This invention relates to photographic camera apparatus and, more particularly, to photographic camera apparatus of the folding type including a collapsible opaque exposure chamber and a collapsible flare baffle positioned within the exposure chamber to reduce flare light.

2. Description of the Prior Art

Many photographic cameras have objective lenses which are capable of satisfactorily imaging areas of object space that are larger than the area desired to be recorded when a picture is taken. As a consequence of this, unwanted radiation having its origins outside of a camera's desired field of view may enter the interior of the camera where it can reflect from internal surfaces and eventually strike the film's photosensitive surface. When this occurs, depending on the nature of the internal reflection, either extraneous images are formed in the picture or an overall fog is created which causes a reduction in picture contrast. In either case, the quality of the final picture may be seriously degraded unless suitable means are provided for preventing the unwanted radiation or flare light from reaching the film during exposure.

Those skilled in the photographic arts have recognized this long standing problem and have provided solutions in a variety of forms. Examples of traditional solutions include the use of liner materials, such as flocking, placed on interior camera surfaces to absorb stray radiation or flat black paint to reduce reflections. Another well known solution involves the provision of baffles arranged perpendicular to the camera's optical path to intercept the unwanted radiation to prevent it from ever reaching the film. While these solutions are quite adequate, they evidently have their greatest utility in non-folding type cameras where size, cost, and manufacturing considerations are relatively unimportant.

Another well known solution which has particular application in non-folding type cameras is disclosed in U.S. Pat. No. 1,479,112, issued to W. Spenks on Jan. 1, 1924 and entitled "Light Absorber For Cameras" where the patentee shows a series of rearwardly projecting septums located behind the lens of a camera for preventing flare or fogging by intercepting peripheral light rays passing through the lens.

Another solution particularly suitable for non-folding type cameras is disclosed in copending U.S. application Ser. No. 620,924 filed on Oct. 9, 1975 in the name of Bruce K. Johnson and entitled "Anti-Flare Structure For Photographic System" now U.S. Pat. No. 4,057,815. In this disclosure the applicant shows a rigid opaque exposure chamber which employs specularly reflective interior wall surfaces and serrations to control stray radiation.

However, none of the foregoing solutions are suitable for use with folding type cameras which are collapsed into a compact size suitable for storage and transport.

There are a number of U.S. Patents which describe shutter housing structures having flare reducing means located behind a photographic objective lens. Among these are U.S. Pat. No. 2,877,699 issued to M. N. Fairbanks on Mar. 17, 1969 and entitled "Photographic Apparatus", U.S. Pat. No. 3,044,376 issued to K. Gebele on July 17, 1962 and entitled "Photographic Apparatus", and U.S. Pat. No. 3,709,129 issued to Karl-Heinz Lange on Jan. 9, 1973 and entitled "Camera With Retractable Objective", each of which disclose cameras provided with conically shaped projections coaxial with the lens and extending rearwardly toward the film, the projections having a stepped or rigid surface for reducing flare. A disclosure similar to the last three mentioned patents showing a conical projection extending rearwardly of a lens is shown in U.S. Pat. No. 3,479,945 issued to C. Koch on Nov. 25, 1969 and entitled "Photographic Focusing Camera". However, each of these shutter housing structures apparently have limited effectiveness as major flare reducing means but rather are intended for use in reducing local reflections on surfaces located immediately behind a lens and which generally would not extend into a camera's exposure chamber because they would interfere with folding the camera.

Solutions for reducing flare in folding type cameras have also been proposed in the patent literature. In U.S. Pat. No. 1,291,405 issued to L. X. Champeau on Jan. 14, 1919 and entitled "Camera", the patentee discloses a camera having an accordian type bellows for interconnecting a lens to a film plane in light-tight fashion. Extensions of the surfaces forming the accordian folds are provided to project toward the optical axis of the lens beyond the apical edges of the folds to serve as baffles to prevent flare light. While this solution is adequate for the type of bellows and camera structure disclosed, it would not be readily adaptable for use in a reflex folding camera of the type with which the present invention is concerned. More particularly, the present invention is concerned with the provision of a flare prevention means for use in a compact folding reflex camera of the type disclosed in U.S. Pat. No. 3,678,831 issued to James G. Baker on July 25, 1972 and entitled "Compact Folding Reflex Camera" and having an opaque elastic envelope which defines an exposure chamber such as that disclosed in U.S. Pat. No. 3,682,068 issued to Frank M. Stieger on Aug. 8, 1972 and entitled "Light Envelope". One of the sources of flare in cameras of the foregoing type is caused by reflections from interior surfaces of the elastic envelope which is stressed upon erection of the camera to form a plurality of generally planar surfaces interconnected to define its exposure chamber.

With elastic light-tight envelopes of the foregoing type, it is necessary to provide a flare prevention means which reduces stray reflections from their interior surfaces while still satisfying the requirement of compactness. In U.S. Pat. No. 3,727,529 issued to Charles DeJesus et. al. on Apr. 17, 1973 and entitled "Combination Flare Baffle and Light Seal for Reflex Camera", the patentees teach the use of a single movable baffle fabricated of a metal stamping to reduce stray light. This solution, while being consistent with compactness, reduces the effects of stray reflections for only certain local interior surfaces of the exposure chamber.

Likewise in the commercial version of Polaroid Corporation's "SX-70 Camera", there is provided a series of spaced apart baffles located on one surface of its elastic light-tight envelope and extending transverse to the optical axis of the camera's lens to reduce stray reflections from that particular surface. Therefore, a need exists for a major flare prevention means for reducing substantially all internal stray reflections which may contribute to flare effects in a compact folding reflex camera having an elastic light-tight envelope of the type referenced. Consequently, it is a primary object of the present invention to satisfy this need.

Another object of the present invention is to provide a collapsible flare baffle insert for a compact collapsible camera.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention relates to a folding photographic camera which is provided with a collapsible light baffle for reducing flare light during exposure and facilitating the folding of the camera into a compact collapsed shape.

The camera includes a plurality of housing sections which are interconnected for relative movement with respect to one another to define a housing for the camera which has a folded position in which the housing sections are spatially arranged in a compact manner suitable for transporting and storing the camera and an extended operative position in which the housing sections are spatially arranged in a predetermined manner to define a space between them for facilitating exposure of a photographic film.

Located within a first one of the housing sections are means for defining an exposure area at a focal plane and for facilitating the positioning of a photographic film in alignment with the exposure area.

Optical means, including an objective taking lens mounted within a second one of the housing sections, are provided for defining an optical path between the exposure area and the objective taking lens so that a real image of a photographic scene may be formed by the optical means on the focal plane when the camera housing is in its extended operative position. The optical means and the peripheral edges of the exposure area cooperate to provide the camera with a field of view which defines the area in object space that the camera will image on the focal plane during a photographic exposure cycle.

Also provided are selectively actuable exposure means for defining a predetermined exposure cycle. During the exposure cycle, light from a photographic scene is imaged on the focal plane by the optical means.

Additionally included is a thin-walled opaque envelope which is configured and arranged between at least the first and second housing sections for movement in correspondence therewith between a collapsed state corresponding to the folded position of the camera housing in which the envelope assumes a compact shape to facilitate the folding of the camera housing and an extended state corresponding to the extended position of the camera housing in which the envelope is extended to define a light-tight exposure chamber of predetermined dimensions and shape extending between at least the first and second housing sections.

Additionally included are means positioned within the exposure chamber for intercepting light from outside the field of view of the camera to prevent such intercepted light from impinging on the camera's focal plane during the exposure cycle. The intercepting means comprise a collapsible open ended light baffle which is adapted to assume an extended predetermined configuration when the camera housing is in its extended position and a compact collapsed configuration when the camera housing is in its folded position. The light baffle includes an inlet and an outlet opening each of which is aligned along the optical path of the camera. The outlet opening of the baffle is positioned internally of and spaced away from the interior surfaces of the thin-walled opaque envelope when the light baffle is in its extended position. In this manner, the light baffle is arranged to permit light from within the field of view of the camera to pass through it and proceed toward the focal plane. Intermediate portions of the light baffle between its inlet and outlet openings are arranged along the optical path of the camera to intercept light originating from outside the field of view of the camera to prevent such intercepted light from adversely affecting the quality of the image of the photographic scene formed on the focal plane during the exposure cycle.

The thin-walled opaque envelope of the preferred embodiment of the invention is formed of a flexible material and includes at least one pair of opposed side wall sections. The side wall sections have a series of permanent creases arranged in a predetermined manner to define a plurality of panel sections between the creases which fold in accordian fashion about the creases to overlap each other when the camera housing is placed in the folded position. The panel sections include a plurality of spaced baffles each of which extends in a generally transverse direction with respect to the creases and projects toward the interior of the light-tight exposure chamber to a predetermined dimension to intercept select portions of unwanted light originating from outside the field of view of the camera when the side walls are disposed in their extended state so as to prevent such intercepted light from impinging on the focal plane of the camera during the exposure cycle. The projecting spaced baffles are arranged in a staggered manner on preselected adjacent ones of the panel sections so that the panel sections on one adjacent panel section enter into the space between the baffles on the other adjacent panel section so as to minimize the thickness of the side wall sections when the panels overlap each other while the opaque envelope is in its collapsed state. This arrangement enhances the compactability of the opaque envelope when the camera is placed in its folded position.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figures 1, 4:
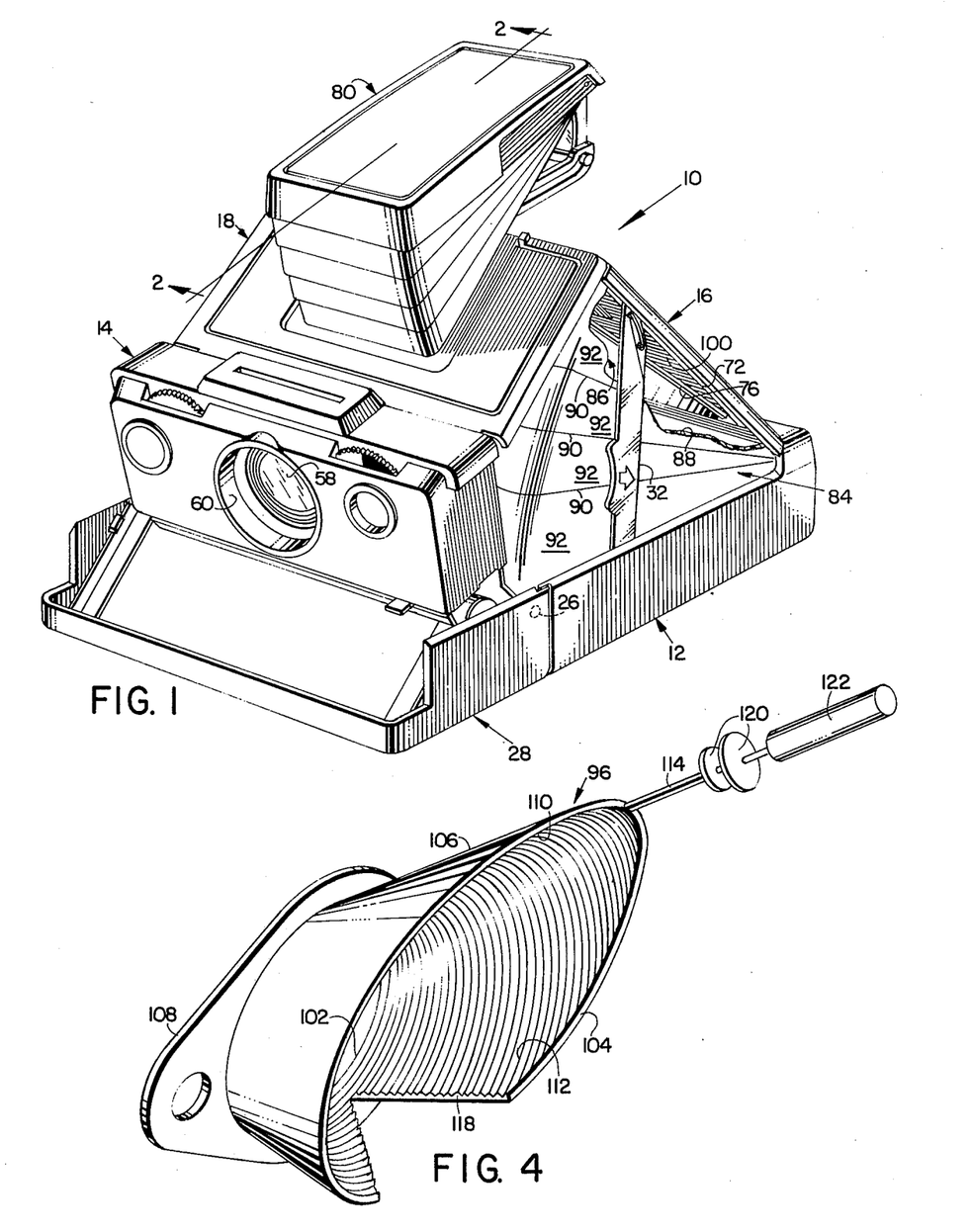
FIG. 1 is a perspective view, with parts broken away, of the camera of the invention shown in its extended operative position.
FIG. 4 is a perspective view of a portion of the camera shown in FIG. 1.
Figures 2, 3:
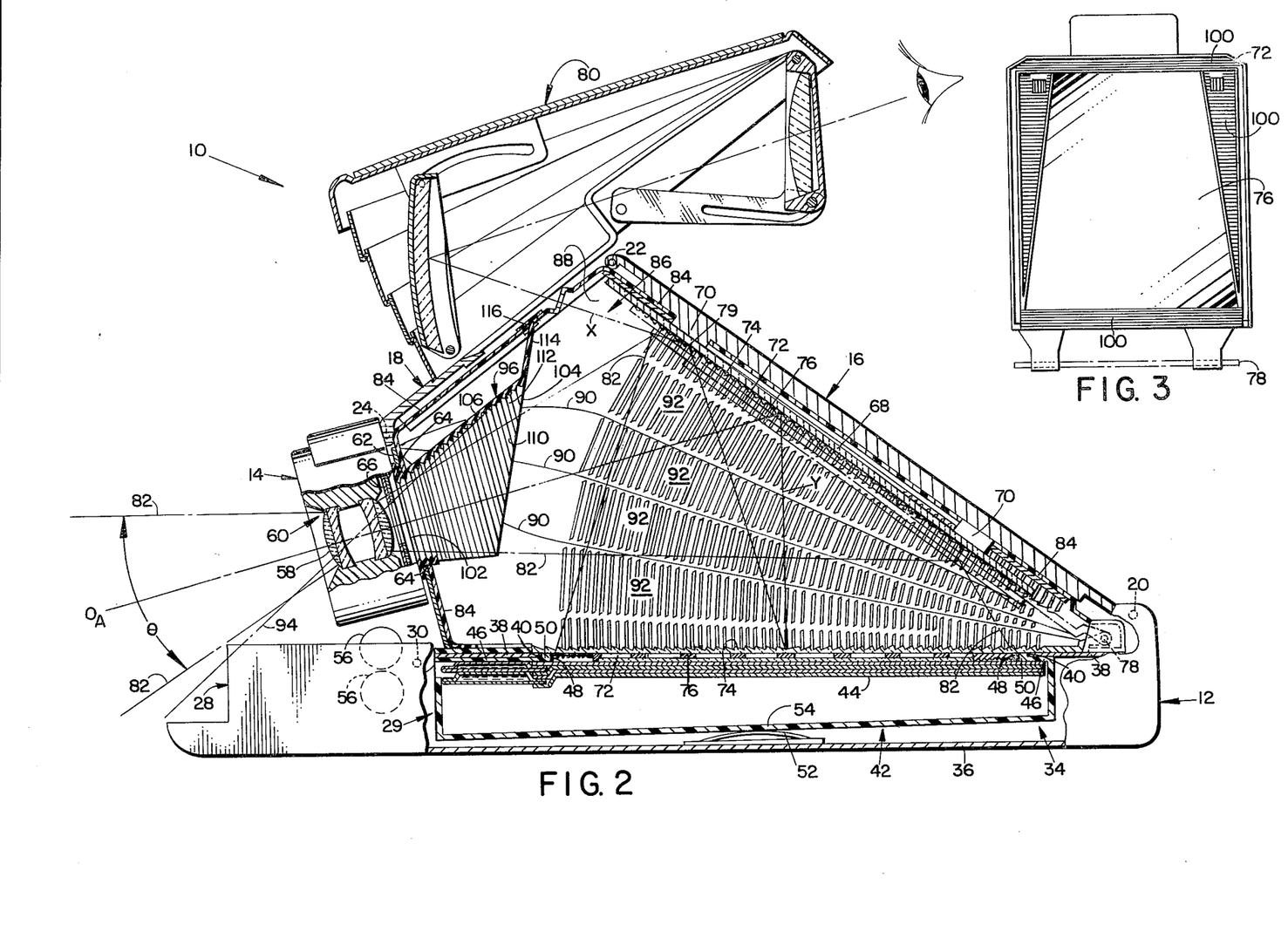
FIG. 2 is a section of the camera shown in FIG. 1 taken generally along line 2—2 of FIG. 1.
FIG. 3 is a plan view of a portion of the camera shown in FIG. 1.
Figure 5:
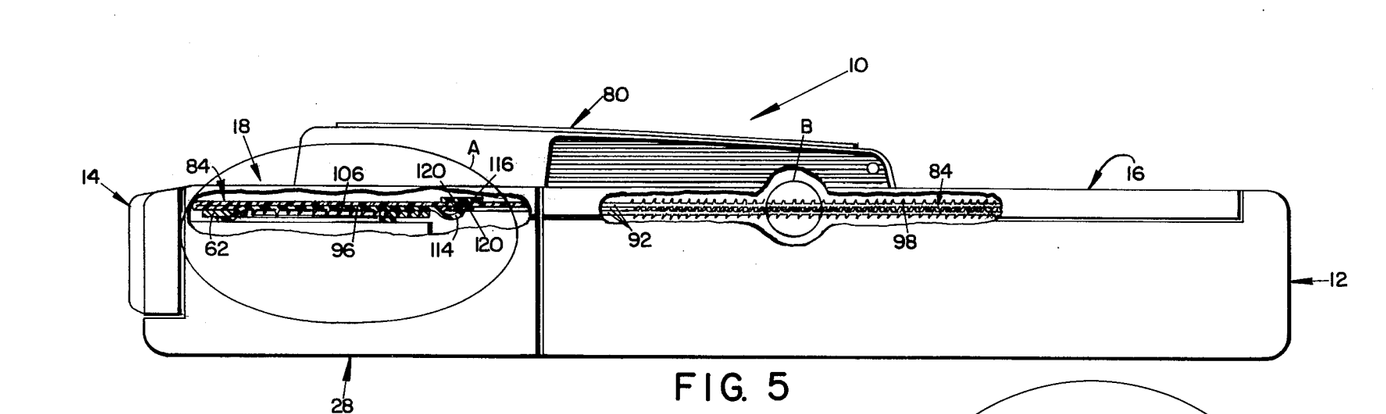
FIG. 5 is a side elevational view of the camera of FIG. 1 shown in its compact folded position with portions sectioned generally along line 2—2 of FIG. 1.

A folding reflex camera 10 of the kind in which the preferred embodiment of the present invention is most useful for purposes of preventing flare is shown in FIGS. 1 and 2 in a fully extended operative position and in FIG. 5 in a folded position in which it has a compact shape suitable for transport and storage. The camera 10 is representative of the type more fully disclosed in U.S. Pat. No. 3,714,879 issued to Edwin H. Land et. al. on Feb. 6, 1973 and entitled "Reflex Camera".

Referring now to those figures, the camera 10 includes a foldable housing formed by a plurality of housing sections 12, 14, 16 and 18 pivotally coupled to one another at pivots 20, 22, 24 and 26 for relative movement with respect to one another to provide the camera 10 with its folded and extended positions. Also included is a housing section 28 which extends forwardly of the housing section 12 and is pivotally coupled thereto at pivot 30 as shown in FIG. 2.

When the camera 10 is extended, housing sections 12, 14, 16 and 18 cooperate to form a four-sided articulated structure or support frame for supporting a film container and components of the camera's optical and exposure system in a predetermined spatial arrangement. This structural arrangement for providing the camera 10 with a foldable housing in effect defines a four-bar linkage system which is geometrically configured to define a space between the erected housing sections 12, 14, 16 and 18 which provides a structural framework for defining an exposure chamber for the camera 10. Each of the housing sections 12, 14, 16 and 18 are further configured and arranged with respect to one another to provide the camera 10 with its compact shape as illustrated in FIG. 5.

The camera 10 is maintained in its fully extended position by the provision of an erecting link 32 in a well known manner. The erecting link 32 locks the housing sections, 12, 14, 16 and 18, in their predetermined spatial relationship so that the geometric integrity of the camera 10 is preserved while it is in its extended position. The erecting link 32 may be manually moved so as to interrupt the locking relationship between the housing sections 12, 14, 16, and 18 in order to facilitate the folding of the camera 10.

Housing section 12 includes a film cassette receiving chamber 34 which is formed between a bottom wall 36 and an apertured planar top wall 38 spaced away from the bottom wall 36 in a generally parallel relationship. Peripheral edges 40 (only two shown in FIG. 2) of the aperture in top wall 38 define a rectangular exposure area which is located to provide the camera 10 with a focal plane.

The film receiving chamber 34 is configured to receive a cassette 42 which is preloaded with a plurality of self-processable type film units 44 that are arranged in stacked relationship within the cassette 42. The film cassette 42 includes a forward wall 46 which includes a rectangular aperture 48 that is surrounded by an upstanding rib 50. The aperture 48 defines a generally rectangular light transmitting section in the forward wall 46 that is substantially coextensive with the photosensitive area of each of the film units 44. Located on the bottom wall 36 of the housing section 12 is a resilient spring 52 which contacts a bottom wall 54 of the cassette 42 to urge the forward wall 46 of the cassette 42 against the bottom surface of the apertured wall 38 so that the upstanding rib 50 is telescopically received within the aperture of the wall 38.

Access for loading the cassette 42 into the cassette chamber 34 is accomplished by rotating the housing section 28 about its pivot 30 in a counterclockwise sense (see FIG. 2) to expose an open end 29 of the chamber 34 thereby allowing the cassette 42 to be manually inserted into and removed from the chamber 34.

This arrangement thus provides the camera 10 with a means for defining an exposure area at a focal plane and for facilitating the positioning of a photographic film in alignment with the exposure area.

A pair of processing rollers 56 are positioned on the housing section 28 to receive an exposed film unit 44 as it emerges from the cassette 42 and process such film unit in a well known manner.

Housing section 14 includes a central opening 60 which extends through the housing section 14 and terminates at a rear planar wall 62 having an aperture 64 therein. Mounted within the opening 60 is an adjustable focus objective taking lens 58 for forming an image of a scene to be photographed. Located immediately behind the objective taking lens 58 are a pair of reciprocating shutter blades 66. The blades 66 are selectively actuable for blocking and unblocking the passage of light through the objective taking lens 58 and the aperture 64 in the rear wall 62 of the housing section 12.

Although a mechanism and control means for operating the blades 66 are not shown, well known types may be used such as that disclosed, for example, in U.S. Pat. No. 3,774,516 issued to John P. Burgarella et. al. on Nov. 27, 1973 and entitled "Photographic Control System and Apparatus Having Self-Monitoring Features" and in U.S. Pat. No. 3,744,385 issued to John P. Burgarella et. al. on July 10, 1973 and entitled "Control System for Photographic Apparatus".

The camera 10 is thus provided with an exposure means for defining a predetermined exposure cycle during which cycle light from a photographic scene is allowed to pass from the objective taking lens 58 into the interior of the camera 10.

Supported on the interior surface of the housing section 16 is a stationary planar mirror 68 which is generally parallel with the housing section 16 and is disposed in a plane which forms a predetermined angle with respect to the optical axis, OA, of the objective taking lens 58 and the focal plane of the camera 10. The stationary mirror 68 is secured to three bosses 70 (only two of which are shown in FIG. 2) which are disposed in a triangluar pattern to provide the mirror 68 with a three point support system. When the camera 10 is disposed in its extended position as illustrated in FIG. 2, light passing through the objective taking lens 58 impinges upon the reflective surface of the mirror 68 and is reflected downwardly toward its exposure area thereby establishing a folded optical path between the objective taking lens 58 and the exposure area.

Positioned over the exposure area as shown in FIG. 2 is a light opaque reflex member 72 (also shown in FIG. 3) which prevents exposure of a forwardmost film unit 44 by any light which may be reflected from the mirror 68. The reflex member 72 is provided with a Fresnel type mirror 74 which faces the stationary mirror 68 when the reflex member 72 is positioned in overlying relationship to the camera's exposure area. Also located on the reflex member 72, on the side opposing the Fresnel mirror 74, is a conventional reflecting mirror 76.

The reflex member 72 is pivotally coupled at pivot 78 for movement between a first position wherein it overlies the camera's exposure area and a second position shown in phantom in FIG. 2 where the Fresnel type mirror 74 contacts the surface of the stationary mirror 68.

When the reflex member 72 is in its first position, light from the objective taking lens 58 is reflected via the planar mirror 68 onto the Fresnel type mirror 74 where it forms an image of the scene to be photographed. The Fresnel mirror 74 then reflects rays upwardly where it impinges upon the stationary mirror 68 at a location generally designated at 79 in FIG. 2. From location 79 light is then reflected into a foldable viewing system 80 which provides the user with a means for observing the photographic scene. In FIG. 2, the path of travel that an axial ray undergoes in reaching the user's eye is illustrated.

When the reflex member 72 is in its second position, light from the objective taking lens 58 is reflected from the mirror 76 directly onto the photosensitive area of a forwardmost film unit 44 disposed within the camera's exposure area.

This optical arrangement provides the camera 10 with alternate folded light paths (X and Y in FIG. 2) corresponding to distinct viewing-focusing and exposure modes of operation. Along path X light from the objective taking lens 58, which forms an image of a photographic scene, may be viewed directly by the camera user while the camera 10 is in its viewing and focusing mode for purposes of selecting the contents of the photographic scene. Along the second path, Y, light from the objective taking lens 58 directly impinges upon the photosensitive area of a film unit 44 to form an image of the photographic scene in a forwardmost film unit 44 while the camera 10 is in its exposure mode of operation wherein the reflex member 72 is located in its second position and the shutter blades 66 are appropriately actuated. Thus optical means have been provided for the camera 10 which include the objective taking lens 58 and the mirror 76 which define an optical path between the camera's exposure area and the objective taking lens 58 so that a real image of a photographic scene may be formed by the optical means on the focal plane of the camera 10 when the camera 10 is in its extended operative position. The optical means and the peripheral edges 40 of the camera's exposure area thus cooperate to provide the camera 10 with a field of view which defines the area in object space that the camera 10 will image on its focal plane during a photographic exposure cycle. The field of view of the camera 10 as shown in FIG. 2 is designated by the angle θ which is formed between a pair of extreme rays 82 which define the usable bundle of rays that will form the image of the photographic scene in a forwardmost one of the film units 44.

Secured to the interior walls of the housing sections 12, 14, 16 and 18 is a thin-walled, opaque, flexible envelope 84 which is configured and arranged for movement in correspondence therewith between a collapsed state as illustrated in FIG. 5 corresponding to the folded position of the camera 10 wherein the envelope 84 assumes a compact shape to facilitate the folding of the camera 10 and an extended state as illustrated in FIGS. 1 and 2 corresponding to the extended position of the camera 10 wherein the envelope 84 is extended to define a light-tight exposure chamber 86 of predetermined dimensions and shape which extends between the housing sections 12, 14, 16 and 18, to enclose the optical path of the camera 10. The envelope 84 is secured to the housing sections 12, 14, 16 and 18 in a light-tight manner by well known methods and has appropriate openings therein which permit light to travel along the optical path of the camera 10 while excluding the entry of unwanted ambient light. For a more detailed description of the material composition and the method of attachment of the envelope 84 to the various housing members of the camera 10, reference may be had to U.S. Pat. No. 3,682,068 issued to Frank M. Stieger on Aug. 8, 1972 and entitled "Light Envelope".

Also included in the flexible opaque envelope 84 are a pair of opposed side walls 88, one of which is shown in FIG. 1 and the other of which is shown in FIG. 2. The side walls 88 are provided with a series of permanent creases 90 which are arranged in a predetermined manner to define a plurality of panel sections 92 between them which fold in accordian like fashion about the creases 90 to overlap each other when the camera 10 is placed in its folded position. This arrangement enhances the foldability of the camera 10 and facilitates the collapsed shape of the flexible envelope 84 as illustrated in FIG. 5.

Because of the nature of the optical system of the camera 10, it is possible for light originating from outside of its field of view, such as the ray 94 illustrated in FIG. 2, to pass through the objective taking lens 58 and strike interior surfaces of the camera 10 located within the exposure chamber 86, and eventually impinge upon the photosensitive surface of a film unit 44 thereby creating extraneous images or reducing the contrast of the final picture. This phenomenon is well known in the photographic arts and the type of light which creates extraneous images or reductions in picture contrast is generally referred to as flare. The camera 10 is provided with flare prevention means in the form of a collapsible, conical-shaped, open-ended light baffle 96 (FIGS. 2 and 4), a plurality of spaced apart baffles 98 (FIGS. 2, 5 and 7) which are integrally molded on the panel sections 92 that are formed between the permanent creases 90 of the side walls 84, and a plurality of spaced serrations 100 (FIGS. 1 and 3) which surround the mirror 76 of the reflex member 72.

Referring now to FIGS. 2 and 4, there is shown the collapsible light baffle 96 which is preferably molded of an elastic material such as a terpolymer comprising ethylene, propylene and diene combined with a predetermined amount of carbon black filament to render it opaque.

The elastic material, along with the thin-walled nature of the light baffle 96, provides it with a resilient characteristic which biases it to assume its normally extended predetermined configuration illustrated as a truncated cone in FIG. 4. When the camera 10 is placed in its extended position, the light baffle 96 automatically assumes its cone-like shape. The light baffle 96 includes an inlet opening 102 and an outlet opening 104 which are interconnected by an intermediate lateral wall portion 106. Surrounding the inlet opening 102 is a flange 108 which serves as a means for attaching the light baffle to the rear planar wall 62 of the housing section 14 (see FIG. 6) so that the light baffle 96 is in optical registration with the objective taking lens 58. When the light baffle 96 is attached with its inlet opening 102 in registration with the objective taking lens 58, it is aligned along the optical axis, OA, of the objective taking lens 58 such that its lateral wall portion 106 forms a diverging channel from the inlet opening 102 to the outlet opening 104 which is spaced away from and generally parallel with the extreme bundle of rays which define the limits of the field of view of the camera 10 as shown in FIG. 2. However, the length of the light baffle 96 as measured along the optical axis, OA, towards the stationary mirror 68 is preferably dimensioned so that the outlet opening 104 does not extend so far rearwardly into the exposure chamber 86 so that it blocks image forming rays reflected from the mirror 68 from reaching the camera's focal plane. Located on an interior surface 110 of the lateral wall 106 are a plurality of spaced apart interior baffles 112 which are concentrically arranged with respect to the axis of revolution of the cone which defines the general shape of the baffle 96 and extend radially toward the axis of revolution to a predetermined dimension so as to trap therebetween select portions of light originating from outside the field of view of the camera. In this manner, any light which may strike the baffles 112 is substantially absorbed between the baffles by undergoing a plurality of multiple reflections.

When the baffle 96 is positioned along the optical axis, OA, of the objective taking lens 58 with its apical end located adjacent the aperture 64 of the rear wall 62 and the shutter blades 66, it serves as a means for intercepting light from outside of the field of view of the camera to prevent such intercepted light from impinging on the focal plane of the camera 10 during its exposure cycle.

Means are provided for maintaining the baffle 96 in its extended predetermined configuration in alignment along the optical path of the camera 10 while the camera 10 is in its extended position. The maintaining means comprises an elongated flexible member 114 having one end integrally attached to the lateral wall 106 of the baffle 96 near the periphery of the outlet opening 104 and its other end attached at a predetermined location 116 located on the flexible envelope 84 just below the housing section 18 (FIG. 2). The flexible member 114 is configured and arranged with respect to the light baffle 96 and the opaque envelope 84 so that a tension is created in the elongated flexible member 114 which is transmitted to the lateral wall 106 of the light baffle 96 thereby maintaining the light baffle in alignment along the optical path of the camera 10 while the camera 10 is in its extended position. The tension is the elongated member 114 is released as the camera 10 is placed into its folded position to facilitate the deformation of the light baffle 96 into its compact configuration. Also included in the lateral wall 106 it a notched out V-shaped portion 118 which enhances the collapsability of the light baffle 96 without substantially reducing its effectiveness as a means for intercepting unwanted radiation.

Included on the other end of the flexible member 114 are a pair of flexible flanges 120 which are concentrically disposed with respect to the elongated dimension of the flexible member 114 and are spaced apart by substantially the thickness of the thin-walled envelope 84. At the predetermined location 116 of the thin-walled opaque envelope 84, there is an aperture which extends through the envelope 84 which is configured to receive the flanged end of the flexible member 114 so that one of the flanges 120 overlaps the edges of the aperture on the exterior surface of the opaque envelope 84 while the other of the flanges 120 overlaps the edges of the aperture on the interior surface of the opaque envelope 84 thereby providing a means of attaching the flanged end of the flexible member 114 to the thin-walled opaque envelope 84 in a light-tight manner. In order to facilitate its attachment, the elongated flexible member 114 is also provided with a disposable tail member 122 which may be used as a means for pulling its flanged end through the aperture located at 116 until the flanges 120 are in position. Afterwards the disposable tail member 122 may be cut off.

Figure 6:
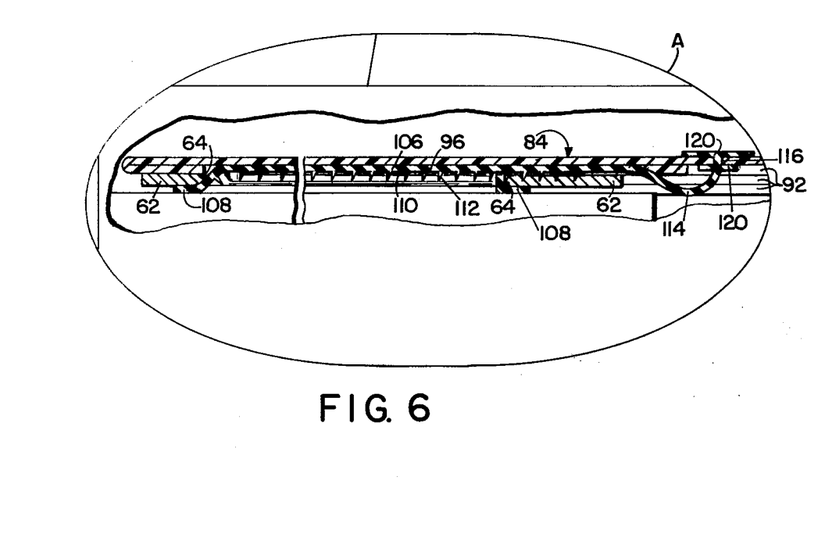
FIG. 6 is an enlarged view of the portion of the camera shown in FIG. 5 designated as the area enclosed by line A.
Figure 7:
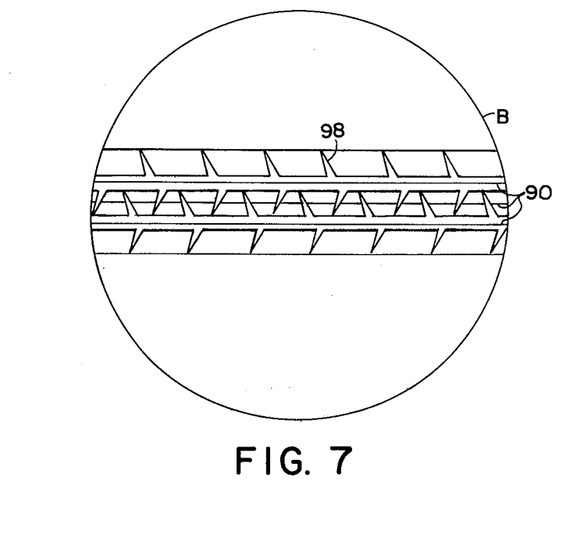
FIG. 7 is an enlarged view of the portion of the camera shown in FIG. 5 designated as the area encircled by line B.

The spaced baffles 98 integrally molded with the panel sections 92 of the side walls 88 each extend in a generally transverse direction with respect to the permanent creases 90 (FIG. 2) and project towards the interior of the exposure chamber 86 of the camera 10 to a predetermined dimension to intercept select portions of unwanted light originating from outside the field of view of the camera 10 when the side walls 88 are disposed in their extended state so as to prevent such intercepted light from impinging on the focal plane of the camera 10 during its exposure cycle. The projecting spaced baffles 98 are arranged in a staggered manner as best illustrated in FIG. 7 on preselected adjacent ones of the panel sections 92 so that the baffles on one of the adjacent panel sections enter the space between the baffles 98 on the other adjacent panel section in order to minimize the thickness of the side wall sections 88 when the panels 92 overlap each other when the envelope 84 is in its collapsed state as shown in FIGS. 5, 6 and 7.

As a further means of flare prevention the serrations 100, as best shown in FIG. 3, are positioned on the reflex member 72 on the surface which faces toward the interior of the exposure chamber 86 and on which the mirror 76 is located. The portions of the reflex member 72 on this surface which are not occupied by the mirror 76 are provided with the serrations 100 for the purpose of intercepting unwanted light which may impinge upon the serrations 100 to prevent such intercepted light from impinging on the focal plane of the camera 10 during its exposure cycle. These serrations 100 absorb radiation in a manner previously described with reference to the baffles 112.

Certain changes may be made in the above described embodiment without departing from the scope of the invention and those skilled in the art may make such changes according to the teachings of the disclosure. For example, it is obvious that the present invention is not restricted for use with a reflex type folding camera. Therefore, it is intended that all matter contained in the above description or shown in the accompanying drawings shall be interpreted as illustrative and not in a limiting sense.

What is claimed is:

1. A folding photographic camera comprising:
a plurality of housing sections interconnected for relative movement with respect to one another to define a housing for said camera having a folded position wherein said housing sections are spatially arranged in a compact manner suitable for transporting said camera and an extended operative position wherein said housing sections are spatially arranged in a predetermined manner to define a space between them for facilitating exposure of a photographic film;

means within a first one of said housing sections for defining an exposure area at a focal plane and for facilitating the positioning of a photographic film in alignment with said exposure area;

optical means, including an objective taking lens mounted within a second one of said housing sections, for defining an optical path between said exposure area and said objective taking lens so that a real image of a photographic scene may be formed by said optical means on said focal plane when said camera housing is in said extended operative position, said optical means and the peripheral edges of said exposure area cooperating to provide said camera with a field of view which defines the area in object space that said camera will image on said focal plane during a photographic exposure cycle;

selectively actuable exposure means for defining a predetermined exposure cycle during which cycle, light from a photographic scene is imaged on said focal plane by said optical means;

a thin-walled opaque envelope configured and arranged between at least said first and second housing sections for movement in correspondence therewith between a collapsed state corresponding to said folded position of said camera housing wherein said envelope assumes a compact shape to facilitate the folding of said camera housing and an extended state corresponding to said extended position of said camera housing wherein said envelope is extended to define a light-tight exposure chamber of predetermined dimensions and shape extending between at least said first and second housing sections; and means positioned within said exposure chamber for intercepting light from outside of said field of view of said camera to prevent such intercepted light from impinging on said focal plane during said exposure cycle, said intercepting means comprising a collapsible open ended light baffle adapted to assume an extended predetermined configuration when said camera housing is in its said extended position and a compact collapsed configuration when said camera housing is in said folded position, said light baffle having inlet and outlet openings aligned along said optical path with its said outlet opening positioned internally of and spaced from the interior surfaces of said thin-walled opaque envelope when said light baffle is in its said extended position to permit light from within said field of view of said camera to pass through said light baffle and proceed toward said focal plane and portions intermediate said inlet and outlet openings arranged along said optical path to intercept light originating from outside of said field of view of said camera thus preventing such intercepted light from adversely affecting the quality of the image of the photographic scene formed on said focal plane during said exposure cycle.

2. The camera of claim 1 wherein said inlet opening of said light baffle is positioned adjacent said objective taking lens and said outlet opening is spaced away from said inlet opening along said optical path by a distance which is minor compared with the length of said optical path.

3. The camera of claim 1 wherein said collapsible light baffle comprises a thin-walled hollow shell fabricated of an opaque elastic material to provide said shell with a resilient characteristic, said shell being biased by said resilient characteristic to normally assume said extended predetermined configuration when said camera housing is in said extended position and being deformed into said compact configuration by said housing sections when said camera housing is placed in said folded position.

4. The camera of claim 3 wherein said elastic material comprises a terpolymer having a predetermined amount of carbon black filament to render it opaque.

5. The camera of claim 4 wherein said terpolymer comprises ethylene, propylene, and diene.

6. The camera of claim 3 further including means for maintaining said shell in alignment along said optical path when said camera housing is in said extended position.

7. The camera of claim 3 wherein said extended predetermined configuration of said hollow shell is generally shaped in the form of a truncated cone having said inlet opening at its apical end and said outlet opening at its base, said intermediate portions of said shell being defined by the lateral wall of said cone which extends in a diverging manner from said inlet opening to said outlet opening, said lateral wall of said cone being spaced away from and generally parallel with the extreme bundle of rays which define the limits of said field of view of said camera.

8. The camera of claim 7 wherein said cone further includes means for mounting its apical end on said second housing section with said inlet opening in optical registration with said objective taking lens.

9. The camera of claim 7 wherein the internal surface of said lateral wall of said cone includes a plurality of spaced apart interior baffles concentrically arranged with respect to the axis of revolution of said cone and extending radially toward said axis of revolution to a predetermined dimension so as to trap therebetween select portions of light originating from outside of said field of view of said camera.

10. The camera of claim 7 further including means for maintaining said cone in alignment along said optical path when said camera housing is in said extended position.

11. The camera of claim 10 wherein said maintaining means comprises an elongated flexible member having one end attached to said lateral wall of said cone near the periphery of said outlet opening and its other end attached at a predetermined location with said thin-walled opaque envelope, said elongated flexible member being configured and arranged with respect to said cone and said opaque envelope so that a tension is created in said elongated flexible member which is transmitted to said lateral wall of said cone thereby maintaining said cone in alignment along said optical path while said camera housing is in said extended position and to release said tension to facilitate the deformation of said cone into its said compact configuration when said camera housing is placed in said folded position.

12. The camera of claim 1 further including means for maintaining said collapsible light baffle in alignment along said optical path when said camera housing is in said extended position.

13. The camera of claim 12 wherein said maintaining means comprises an elongated flexible member having one end attached to said lateral wall of said cone near the periphery of said outlet opening and its other end attached at a predetermined location with said thin-walled opaque envelope, said elongated flexible member being configured and arranged with respect to said cone and said opaque envelope so that a tension is created in said elongated flexible member which is transmitted to said lateral wall of said cone thereby maintaining said cone in alignment along said optical path while said camera housing is in said extended position and to release said tension to facilitate the deformation of said cone into its said compact configuration when said camera housing is placed in said folded position.

14. The camera of claim 13 wherein said end of said elongated flexible member attached to said lateral wall of said cone is integrally molded therewith and said other end of said flexible member includes a pair of flexible flanges concentrically disposed with respect to the elongated dimension of said flexible member and spaced apart by substantially the thickness of said thin-walled envelope and wherein said predetermined location of said thin-walled opaque envelope includes means for defining an aperture at said predetermined location, extending through said envelope, and configured to receive said flanged end of said flexible member so that one of said flanges overlaps the edges of said aperture on the exterior surface of said thin-walled opaque envelope while the other of said flanges overlaps the edges of said aperture on the interior surface of said thin-walled opaque envelope thereby attaching said flanged end of said flexible member to said thin-walled opaque envelope in a light-tight manner.

15. The camera of claim 1 wherein said thin-walled opaque envelope is formed of a flexible material and includes at least one pair of opposed side wall sections, said side wall sections having a series of permanent creases arranged in a predetermined manner to define a plurality of panel sections between said creases which fold in accordian fashion about said creases to overlap each other when said camera housing is placed in said folded position thereby facilitating said compact collapsed shape of said envelope, said panel sections including a plurality of spaced baffles each of which extends in a generally transverse direction with respect to said creases and projects toward the interior of said light-tight exposure chamber to a predetermined dimension to intercept select portions of unwanted light originating from outside of said field of view of said camera when said side walls are disposed in their extended state so as to prevent such intercepted light from impinging on said focal plane during said exposure cycle.

16. The camera of claim 15 wherein said projecting spaced baffles are arranged in a staggered manner on preselected adjacent ones of said panel sections so that the baffles on one of said adjacent panel sections enter the space between the baffles on the other of said adjacent panel sections so as to minimize the thickness of said side wall sections when said panels overlap each other while said opaque envelope is in said collapsed state.

17. The camera of claim 1 wherein said optical means further includes a mirror mounted on a reflex member adapted for movement between a first position covering said exposure area when said camera housing is in said extended position and a second position wherein said mirror is positioned with respect to said objective taking lens and said exposure area in a manner to fold said optical path between said objective taking lens and said exposure area when said camera housing is in said extended position, said reflex member having a surface facing toward the interior of said light-tight exposure chamber, said reflex surface having portions thereof not occupied by said mirror which unoccupied portions include a plurality of serrations for intercepting any unwanted light which may impinge upon said serrations to prevent such intercepted light from impinging on said focal plane during said exposure cycle.

18. A folding photographic camera comprising:
a plurality of housing sections interconnected for relative movement with respect to one another to define a housing for said camera having a folded position wherein said housing sections are spatially arranged in a compact manner suitable for transporting said camera and an extended operative position wherein said housing sections are spatially arranged in a predetermined manner to define a space between them for facilitating exposure of a photographic film;
means within a first one of said housing sections for defining an exposure area at a focal plane and for facilitating the positioning of a photographic film in alignment with said exposure area;
optical means, including an objective taking lens mounted within a second one of said housing sections, for defining an optical path between said exposure area and said objective taking lens so that a real image of a photographic scene may be formed by said optical means on said focal plane when said camera housing is in said extended operative position, said optical means and the peripheral edges of said exposure area cooperating to provide said camera with a field of view which defines the area in object space that said camera will image on said focal plane during a photographic exposure cycle;
selectively actuable exposure means for defining a predetermined exposure cycle during which cycle, light from a photographic scene is imaged on said focal plane by said optical means;
a thin-walled opaque envelope configured and arranged between at least said first and second housing sections for movement in correspondence therewith between a collapsed state corresponding to said folded position of said camera housing wherein said envelope assumes a compact shape to facilitate the folding of said camera housing and an extended state corresponding to said extended position of said camera housing wherein said envelope is extended to define a light-tight exposure chamber of predetermined dimensions and shape extending between at least said first and second housing sections, said thin-walled opaque envelope being formed of a flexible material and including at least one pair of opposed side wall sections, said side wall sections having a series of permanent creases arranged in a predetermined manner to define a plurality of panel sections between said creases which fold in accordian fashion about said creases to overlap each other when said camera is placed in said folded position thereby facilitating said compact collapsed shape of said opaque envelope, said panel sections including a plurality of spaced baffles each of which extends in a generally transverse direction with respect to said creases and projects toward the interior of said light-tight exposure chamber to a predetermined dimension to intercept select portions of unwanted light originating from outside of said field of view of said camera when said side walls are disposed in their extended state so as to prevent such intercepted light from impinging on said focal plane during said exposure cycle, said projecting spaced baffles being arranged in a staggered manner on preselected adjacent ones of said panel sections so that the baffles on one of said adjacent panel sections enter the space between the baffles on the other of said adjacent panel sections so as to minimize the thickness of said side wall sections when said panels overlap each other while said opaque envelope is in said collapsed state.

* * * * *